United States Patent [19]

Amano et al.

[11] 4,349,527
[45] Sep. 14, 1982

[54] IRON-TITANIUM-NIOBIUM ALLOY

[75] Inventors: Muneyuki Amano, Chiba; Yasuo Sasaki, Tokyo, both of Japan

[73] Assignee: National Research Institute for Metals, Tokyo, Japan

[21] Appl. No.: 72,643

[22] Filed: Sep. 5, 1979

[30] Foreign Application Priority Data

Jan. 29, 1979 [JP] Japan .................................... 54/8195

[51] Int. Cl.³ .................. C22C 38/12; C01B 6/24
[52] U.S. Cl. .................................. 423/644; 75/123 J; 75/123 M; 75/251
[58] Field of Search ................. 75/123 J, 123 M, 251; 423/644

[56] References Cited

U.S. PATENT DOCUMENTS 4,111,689  9/1978  Liu .................................... 75/123 M

OTHER PUBLICATIONS

Larsen et al., The Manufacture of Titanium Alloys, Titanium Project, Report No. 9–Final Report, Navy Contract No. NOa(s) 51-006-C, Navy Department Bureau of Aeronautics, Sep., 1952, pp. 1, 4, 36, 37, 38, 45.

Nishimura et al., Supraleitung und Phasenumwandlung Bei Titanlegierungen, Z. Metallkde. 59 (1968), pp. 69–73.

Primary Examiner—L. Dewayne Rutledge
Assistant Examiner—Christopher W. Brody
Attorney, Agent, or Firm—Sherman & Shalloway

[57] ABSTRACT

An iron-titanium-niobium alloy of the following formula $$Fe_xNb_yTi_z \quad [I]$$

wherein $x+y+z=1$, $0.50 \geq x \geq 0.40$, and $0.10 \geq y \geq 0.05$; and its hydride. Contacting of the iron-titanium-niobium alloy with high-pressure hydrogen gas at room temperature results in its conversion to a hydride. The hydride has the property of easily releasing hydrogen. Thus, the iron-titanium-niobium alloy is useful as a hydrogen storage medium.

6 Claims, 9 Drawing Figures

IRON-TITANIUM-NIOBIUM ALLOY

This invention relates to an iron-titanium-niobium alloy. More specifically, it relates to an iron-titanium-niobium alloy which absorbs a large quantity of hydrogen at room temperature, and to a hydride of an iron-titanium-niobium alloy which releases a large quantity of hydrogen at room temperature.

Hydrogen has various superior characteristics as an energy medium. Extensive investigation has therefore been made about the possibility of developing a system which will produce hydrogen by utilizing surplus electric power at night or energies obtained discontinuously such as solar, tidal and wind energies, and convert the hydrogen so produced into an energy such as electric power or fuels. Thus, much is expected in the development of an overall system involving the production, storage, transportation and utilization of hydrogen.

Methods have previously been known to store and transport hydrogen by utilizing hydrides of alloys. Alloy hydrides containing hydrogen in the same or higher density as or than liquid hydrogen have been known. For example, there have been well known intermetallic compounds of iron-titanium, lanthanum-nickel, Mischmetal-nickel, titanium-manganese, magnesium-nickel, and magnesium-copper.

Intermetallic compounds of the lanthanum-nickel and Mischmetal-nickel series have superior hydrogen storing properties, but have the defect of large weight and high price.

Intermetallic compounds of the titanium-manganese series have the excellent advantage that they can absorb hydrogen gas without subjecting them to an activating treatment using high-temperature high-pressure hydrogen gas. However, they have a fatal defect as a hydrogen storage medium in that the resulting hydrides release less hydrogen and retain more hydrogen.

Intermetallic compounds of the magnesium-nickel and magnesium-copper series are superior in that they have a large amount of hydrogen stored per unit weight. They, however, have the defect that the resulting hydrides have a hydrogen dissociation equilibrium pressure of several atmospheres for the first time when they are heated to a high temperature of more than 300° C., thus showing difficulty of releasing hydrogen.

Intermetallic compound of the iron-titanium series expressed by the formula FeTi is regarded as the most promising hydrogen storage medium in practical application because it has excellent characteristics as hydrogen storage medium and is relatively inexpensive [see, for example, Proc. 11th Intersociety Energy Conversion Engineering Conference, AIChE, 965–971 (1966)]. The iron-titanium intermetallic compound, when brought into contact with high-pressure hydrogen gas at room temperature, absorbs hydrogen at an extremely low speed. Accordingly, in order for this compound to absorb hydrogen rapidly at room temperature, it must be subjected to an activating treatment involving heating it in a fine particle form having a size smaller than 100 mesh to 200° to 400° C. in hydrogen gas under a pressure of several tens of atmospheres. Such an activating treatment is difficult. The FeTi intermetallic compound further had the defect that its hydrogen absorbing equilibrium pressure required for the formation of hydrides by hydrogen absorption is considerably high at room temperature, and at a temperature somewhat higher than room temperature, for example at 60° C., the amount of hydrogen it absorbs decreases.

An iron-manganese-titanium series intermetallic compound resulting from the substitution of manganese for about 20% of iron in the iron-titanium intermetallic compound has been suggested in an attempt to activate the iron-titanium intermetallic compound easily and to reduce its hydrogen absorbing equilibrium pressure for the formation of a hydride. However, the iron-manganese-titanium intermetallic compound has the defect that at the time of hydrogen releasing, the amount of residual hydrogen is large, and therefore, the amount of hydrogen it releases is small.

It is an object of this invention therefore to provide a novel alloy having various superior properties as a hydrogen storage medium.

Another object of this invention is to provide a hydrogen storage medium comprising a novel alloy which forms a hydride at room temperature at a fast speed without being subjected to a particular activating treatment at high temperature.

Still another object of this invention is to provide a novel alloy hydride which has a dissociation equilibrium pressure of several atmospheres at room temperature and which releases hydrogen in a large amount at a fast rate of releasing.

A further object of this invention is to provide a hydrogen storage medium which is inexpensive and light in weight, does not undergo deterioration in repeated hydriding-dehydriding cycles, and is therefore suitable for practical application.

Other objects of this invention will become apparent from the following description.

According to this invention, there is provided an iron-titanium-niobium alloy of the following formula

$$Fe_xNb_yTi_z \qquad [I]$$

wherein $x+y+z=1$, $0.50 \geq x \geq 0.40$, and $0.10 \geq y \geq 0.005$.

Formula [I] is an empirical formula, and therefore, the suffixes x, y and z merely represent the relative proportions of the number of Fe, Nb and Ti atoms present.

Figure 1:
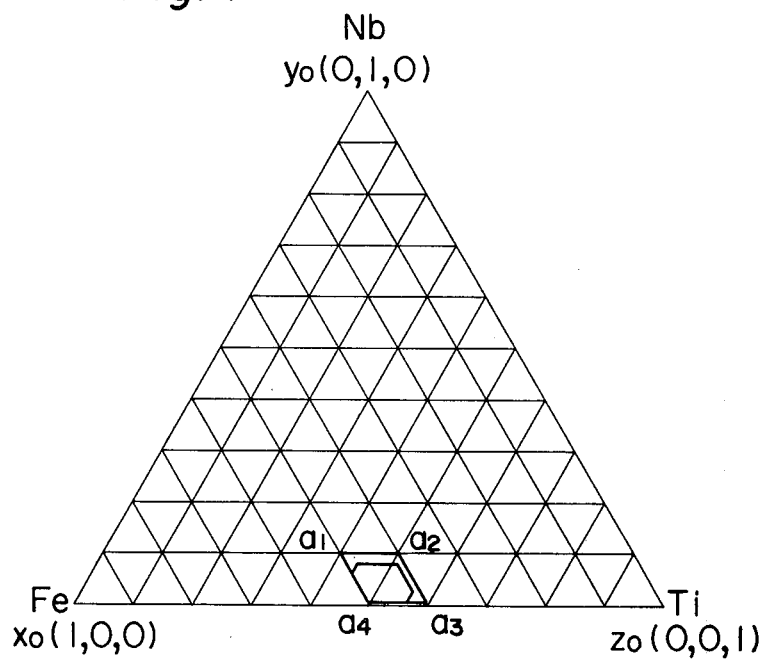
FIG. 1 shows a triangular coordinate composition diagram for the iron-titanium-niobium alloy of the invention.
Figure 2:
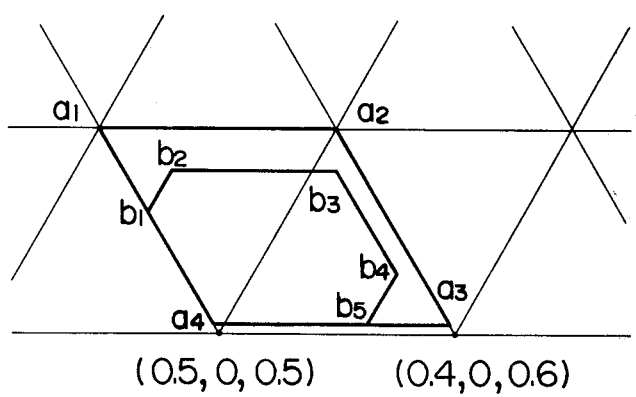
FIG. 2 is an enlarged view of a portion of FIG. 1.

The iron-titanium-niobium alloy of this invention expressed by the above empirical formula is defined by a region connecting points $a_1$, $a_2$, $a_3$ and $a_4$ in this order by a straight line in a triangular coordinate having iron, niobium and titanium at the apexes, as shown in FIGS. 1 and 2 of the accompanying drawings.

In FIG. 1, iron, niobium and titanium are represented by points $x_0$, $y_0$ and $z_0$, respectively. A certain point, for example a point at which the contents of iron, niobium and titanium are x, y and z (provided that $x+y+z=1$) respectively, is expressed and defined as a point (x, y, z). Accordingly, the points $x_0$, $y_0$, and $z_0$ are expressed respectively as (1,0,0), (0,1,0), and (0,0,1).

The points $a_1$, $a_2$, $a_3$ and $a_4$ specifying the composition of the iron-titanium-niobium alloy expressed by formula (I) are expressed as follows:

$a_1$: (0.5, 0.1, 0.4)
$a_2$: (0.4, 0.1, 0.5)
$a_3$: (0.4, 0.005, 0.595)
$a_4$: (0.5, 0.005, 0.495)

An especially preferred species of the iron-niobium-titanium alloy of formula [I] is that expressed by the following formula

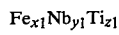
$$Fe_{x_1}Nb_{y_1}Ti_{z_1} \qquad [I]\text{-}1$$

wherein $x_1+y_1+z_1=1$, $0.50 \geqq x_1 \geqq 0.41$, $0.08 \geqq y_1 \geqq 0.005$, and $0.56 \geqq z_1 \geqq 0.44$.

The composition defined by formula [I]-1 is within the range formed by connecting points $b_1$, $b_2$, $b_3$, $b_4$, $b_5$ and $a_4$ by a straight line in this order in FIGS. 1 and 2. These points have the following coordinates.

$b_1$: (0.5, 0.06, 0.44)
$b_2$: (0.48, 0.08, 0.44)
$b_3$: (0.41, 0.08, 0.51)
$b_4$: (0.41, 0.03, 0.56)
$b_5$: (0.435, 0.005, 0.56)
$a_4$: (0.5, 0.005, 0.495)

The iron-titanium-niobium alloy of formula [I] is a novel alloy having iron and titanium as major components and niobium as a minor component as is clearly seen from its definition given above. It is surprising to note that even an alloy of formula [I] which contains as little as 0.5 atomic % of niobium ($y_1 = 0.005$ in formula [I] has a markedly improved hydrogen storing property over conventional known iron-titanium alloy, and forms a hydride at room temperature at a fast rate without being specially activated.

Previously, only those iron-titanium alloys which contain titanium in a proportion within a very narrow range of 49.5 to 52 atomic % have been known to release hydrogen at room temperature after formation of a hydride, as described in the above-cited Proc. 11th Intersociety Energy Conversion Engineering Conference, AIChE, page 966, left column, middle, (1976). This iron-titanium alloy contains 0.98 to 1.08 titanium atoms per iron atom. In contrast, the niobium-containing alloy of this invention can contain 1 to 1.5 titanium atoms per iron atom. In other words, the iron-titanium-niobium alloy of this invention is characterized by the fact that not only does it show better hydrogen storing properties than iron-titanium alloys, but also it has a wider composition range than the iron-titanium alloys. As is readily appreciated from FIG. 1, the composition range of the alloy of this invention is very much limited.

Investigations of the present inventors have shown that an alloy of formula [I] containing more than 50 atomic % of iron generally tends to be inactive to hydrogen and have a decreased amount of hydrogen stored per unit weight; an alloy of formula [I] containing more than 60 atomic % of titanium generally tends to have a larger amount of hydrogen remaining there and to decrease in the reversible amounts of hydrogen absorbed and released; and that an alloy of formula [I] containing more than 10 atomic % of niobium generally tends to have high toughness and become difficult to pulverize finely, and the use of a large amount of expensive niobium is undesirable.

It has also been found that the alloy of formula [I]-1 has especially good hydrogen storing properties and lends itself to especially good handling in pulverization, etc.

The alloy of formula [I] in accordance with this invention can be easily produced by precisely weighing iron, titanium and niobium to predetermined amounts, and melting them by arc. Iron may, for example, be electrolytic iron having a purity of 99.9%. An example of titanium is sponge titanium having a purity of 99.8%. Niobium may have a purity of 99.9%. These purities are common, and there is no need to use materials of especially high purity. Arc melting is a known method. Preferably, the arc melting in this invention is carried out in a non-oxidizing inert atmosphere such as argon or helium. The resulting alloy ingot is cooled, and pulverized to a fine powder by a pulverizer using an agate mortar or superhard alloy mortar. The use of an inert atmosphere in pulverization is not essential, and it may be carried out in the air.

The fine powder of the iron-niobium-titanium alloy of this invention so obtained can be converted to its hydride by contacting it with a high-pressure hydrogen gas.

Accordingly, the present invention also provides a process for producing a hydride of an iron-titanium-niobium which comprises contacting a fine powder of an iron-titanium-niobium alloy of the formula

$$Fe_xNb_yTi_z \qquad [I]$$

wherein $x+y+z=1$, $0.50 \geqq x \geqq 0.40$, and $0.10 \geqq y \geqq 0.005$, with a high-pressure hydrogen gas.

The iron-titanium-niobium alloy of this invention is characterized by the fact that unlike iron-titanium alloys, it can be easily converted to a hydride by contacting it with a high pressure hydrogen gas at room temperature.

The high-pressure hydrogen gas usually denotes hydrogen gases under a pressure of about 2 to 100 atmospheres. Generally, the amount of hydrogen to be absorbed by the alloy generally increases as the pressure of the hydrogen gas to be contacted increases. The room temperature denotes a temperature of about 20° to 30° C. The alloy of this invention absorbs hydrogen gas even at high temperatures.

Contacting of the fine powder of the alloy in the process of this invention can be easily effected by feeding the fine powder of the alloy into a pressure reactor, reducing the pressure of the reactor to about $10^{-5}$ mmHg or lower, and then introducing hydrogen.

One excellent characteristic of the alloy of this invention is that when the absorption and desorption of hydrogen are repeated several times, for example 3 to 4 times, the time required until the saturated amount of hydrogen absorbed is reached becomes very short, and the rate of hydrogen absorption is very high. For example, under certain conditions, the alloy of this invention is activated to such an extent that after repeating absorption and desorption of hydrogen several times, it absorbs hydrogen to the saturated amount within 10 minutes. In order for an iron-titanium alloy to be activated to the same extent, it must first be subjected to an activating treatment involving heating to at least 200° C. in hydrogen under 50 atmospheres.

In the process of this invention, the size of the fine powder of the iron-titanium-niobium alloy used is preferably smaller than about 80 mesh (Tyler's mesh), especially preferably smaller than about 100 mesh (Tyler's mesh).

Thus, according to this invention, a hydride of the iron-titanium-niobium alloy is obtained.

Accordingly, the present invention provides a hydrogen storage medium comprising a fine powder of an iron-titanium-niobium alloy of the formula $$Fe_xNb_yTi_z \qquad [I]$$

wherein $x+y+z=1$, $0.50 \geq x \geq 0.40$, and $0.10 \geq y \geq 0.005$; and
also a hydride of an iron-titanium-niobium alloy of the formula $$Fe_xNb_yTi_z \qquad [I]$$

wherein $x+y+z=1$, $0.50 \geq x \geq 0.40$, and $0.10 \geq y \geq 0.005$.

Preferably, the hydride of the alloy of formula [I] provided by this invention has the composition expressed by the following empirical formula $$Fe_xNi_yTi_zH_u \qquad [II]$$

wherein x, y and z are as defined above, and $1 \geq u > 0$. In formula (II), x, y, z and u represent the relative proportions of atoms present.

This hydride of this invention is characterized by the fact that it contains hydrogen in a density higher than that of liquid hydrogen, and easily releases at room temperature almost all of hydrogen it contains.

Furthermore, the hydride of this invention has the advantage that it can be easily produced at relatively low hydrogen pressures, as will be understood from hydrogen absorption isotherms referred to in Examples to be given hereinbelow.

The following Examples illustrate the present invention in greater detail.

EXAMPLE 1

Figure 3:
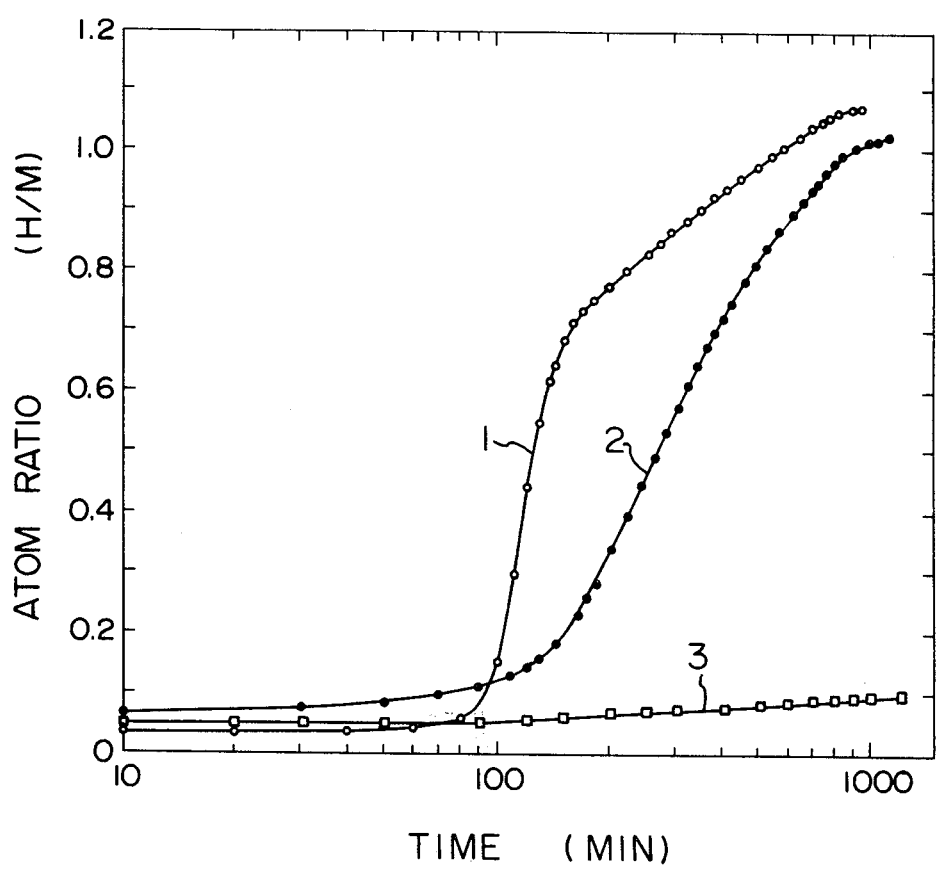
FIG. 3 is a graph showing hydrogen absorption isotherms for alloys according to the invention and a conventional alloy according to Example 1.

(1) A mixture of 50.26 parts by weight of electrolytic iron powder, 47.90 parts by weight of sponge titanium powder and 9.29 parts by weight of niobium powder was arc-melted in an argon atmosphere to form an ingot having the composition $Fe_{0.45}Nb_{0.05}Ti_{0.5}$. The ingot was pulverized to a size smaller than 100 mesh, and a predetermined amount of the resulting powder was fed into a pressure reactor. The pressure of the inside of the reactor was reduced to $5 \times 10^{-6}$ mmHg, and then hydrogen gas having a purity of 99.99999% was introduced under a pressure of 60 atmospheres. The temperature was 22° C. FIG. 3 of the accompanying drawings shows hydrogen absorption isotherms, and curve 1 shows the results obtained by the above procedure.

The abscissa of FIG. 3 represents the reaction time (elapsed time) after the introduction of hydrogen, and the ordinate, the amount of hydrogen reacted (absorbed) in terms of the ratio of the number of hydrogen (H) atoms to that of metal (M) atoms in the alloy.

(2) A powder (having a size smaller than 100 mesh) of an alloy having the composition $F_{0.48}Nb_{0.02}Ti_{0.5}$ obtained in the same manner as in (1) above was reacted with hydrogen under the same conditions as described in (1) above. The results are shown in curve 2 of FIG. 3.

(3) For comparison, a powder (smaller than 100 mesh) of an alloy having the composition FeTi was produced in the same way as in (1) above except that niobium was not used. The results are shown in curve 3 of FIG. 3.

It is seen from the results shown in FIG. 3 that the FeTi alloy (curve 3) scarcely reacts with hydrogen even after a lapse of more than 1,000 minutes. In contrast, the iron-titanium-niobium alloys in accordance with this invention (curves 1 and 2) begin to react abruptly with hydrogen in about 100 minutes to form hydrides, and after about 1,000 minutes, have absorbed therein hydrogen atoms (H) in almost the same number as the metal atoms (M) which constitute the alloy.

The iron-titanium-niobium alloy hydrides produced in this manner could be caused to release hydrogen by reducing the pressure of the inside of the pressure reactor to atmospheric pressure through the operation of a valve. When after the releasing of hydrogen, hydrogen gas under a pressure of 60 atmospheres was again introduced into the pressure reactor, the alloys again absorb hydrogen gas to form hydrides.

When absorption and desorption of hydrogen gas were repeated several times, the reaction of the alloy with hydrogen gas became gradually faster. As shown in FIG. 3, the alloys of this invention initially began to react abruptly with hydrogen gas after a lapse of about 100 minutes. But after repeating absorption and desorption of hydrogen gas several times, the alloys are activated to such an extent that they absorb hydrogen to the saturated amount within about 10 minutes.

The FeTi alloy (curve 3 in FIG. 3) was not activated as in the case of the alloys of this invention even when absorption and desorption of hydrogen were repeated at room temperature (at room temperature, there was scarcely any hydrogen absorption). To activate the FeTi alloy, it was necessary to heat it to 200° C. in hydrogen under a pressure of 50 atmospheres.

X-ray diffraction analysis showed that the alloy having the composition $Fe_{0.48}Nb_{0.02}Ti_{0.5}$ has a CsCl structure which is the same crystal structure as the FeTi alloy, and has a lattice constant of 2.983 Å (the FeTi alloy has a lattice constant of 2.976 Å).

EXAMPLE 2

Each of the alloys described in (1), (2) and (3) of Example 1 was activated in the same manner as described in Example 1. The hydrogen absorbing equilibrium pressures at 40° C. of these alloys were examined, and the results are shown in FIG. 4.

Figure 4:
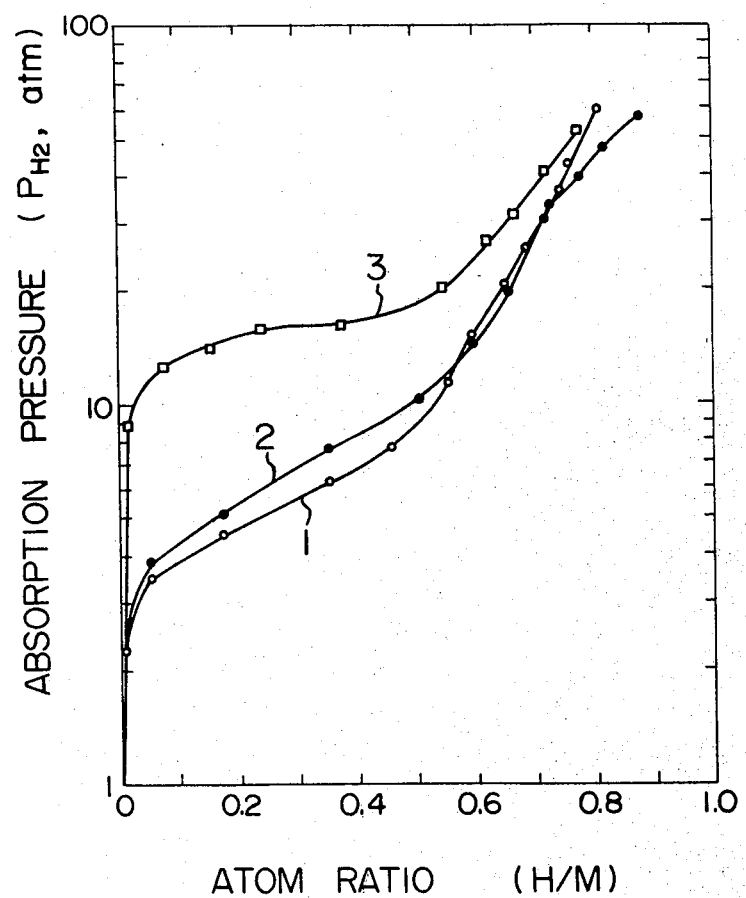
FIG. 4 is a graph showing hydrogen absorbing equilibrium pressures of the same alloys represented in FIG. 3.

In FIG. 4, the abscissa represents the atom ratio (H/M), and the ordinate, the hydrogen absorption equilibrium pressure ($P_{H_2}$, atm.). Curves 1, 2 and 3 correspond to the curves 1, 2 and 3 in FIG. 3.

It is seen from FIG. 4 that the FeTi alloy (curve 3) requires higher hydrogen pressures for hydrogen absorption than do the iron-titanium-niobium alloys of this invention (curves 1 and 2).

The results demonstrate that the FeTi alloy scarcely absorbs hydrogen when brought into contact with hydrogen gas under a pressure of 10 atmospheres at 40° C., whereas the niobium-containing alloy of this invention absorbs hydrogen to an H/M ratio of about 0.5 under the same conditions. The H/M ratio of about 0.5 corresponds to about 1200 cc of hydrogen at 0° C. and 1 atmosphere per gram of the alloy, and to about 706 cc of hydrogen per cm³ of the alloy. In view of the fact that hydrogen gas is filled in a bomb, the H/M ratio of about 0.5 corresponds to the amount of hydrogen gas filled under a pressure of about 700 atmospheres.

When the hydrogen absorption temperature (40° C.) was decreased, the hydrogen absorbing equilibrium pressure decreased, and therefore, a larger amount of hydrogen was absorbed under the same hydrogen pressure.

EXAMPLE 3

The powder (smaller than 100 mesh) of the alloy having the composition $Fe_{0.48}Nb_{0.02}Ti_{0.5}$ used in Example 1, (2) was activated in the same way as in Example 1, and then hydrogen gas under a pressure of 60 atmospheres at 22° C. was introduced to form a hydride of the alloy. The pressures at which the hydride released hydrogen at various temperatures were examined. The results are shown in FIG. 5.

Figure 5:
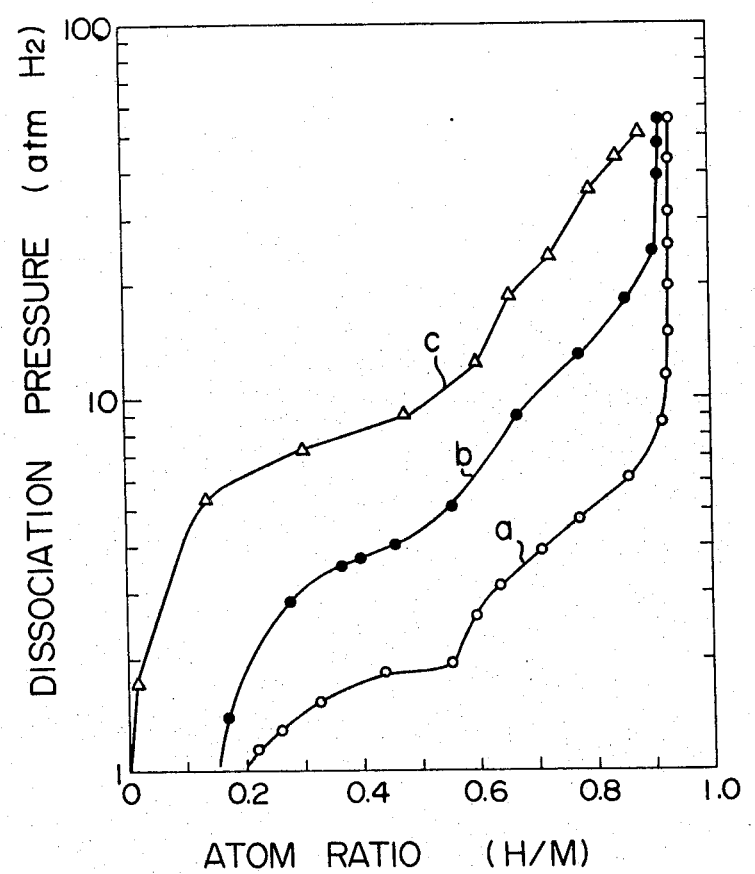
FIG. 5 is a graph of the dissociation pressure as a function of temperature for a hydride of one of the alloys of Example 1 (from Example 3)
Figure 6:
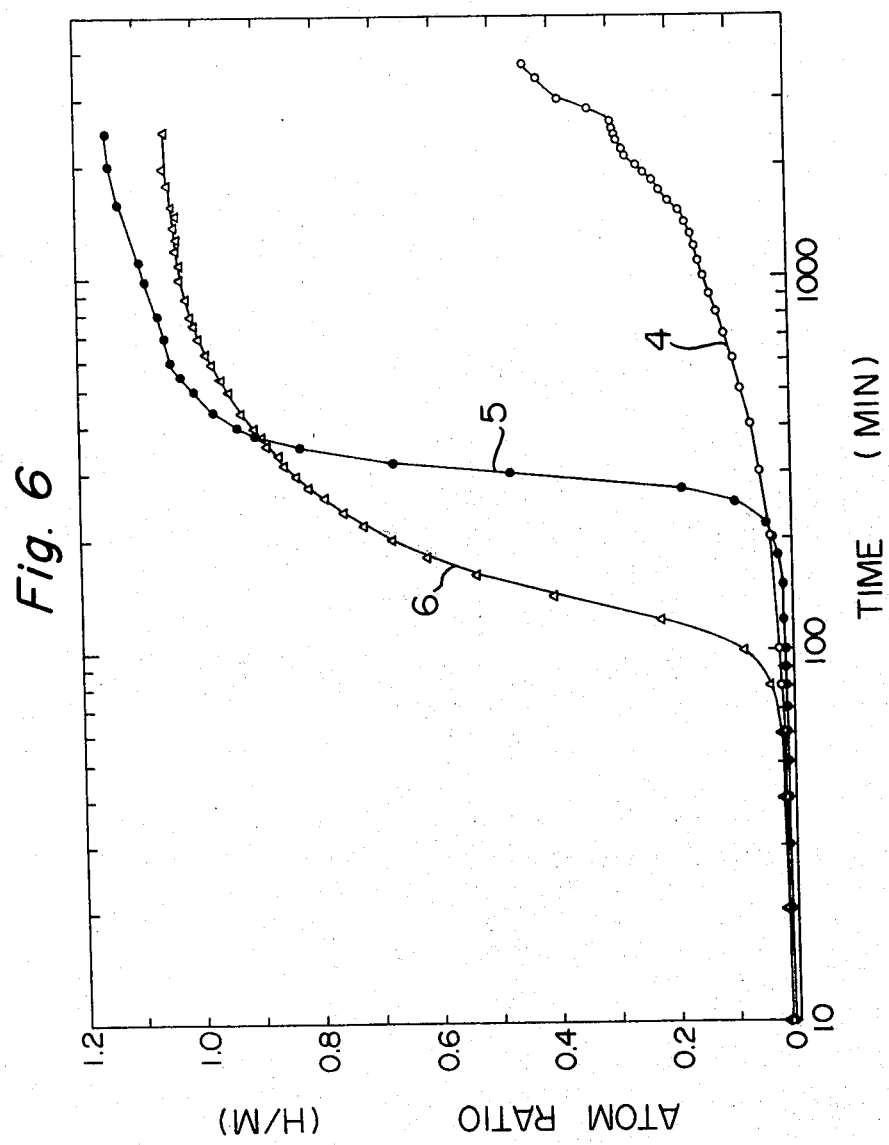
FIGS. 6 and 7 are graphs showing hydrogen absorption isotherms for six different alloys having the composition shown in Example 4.
Figure 7:
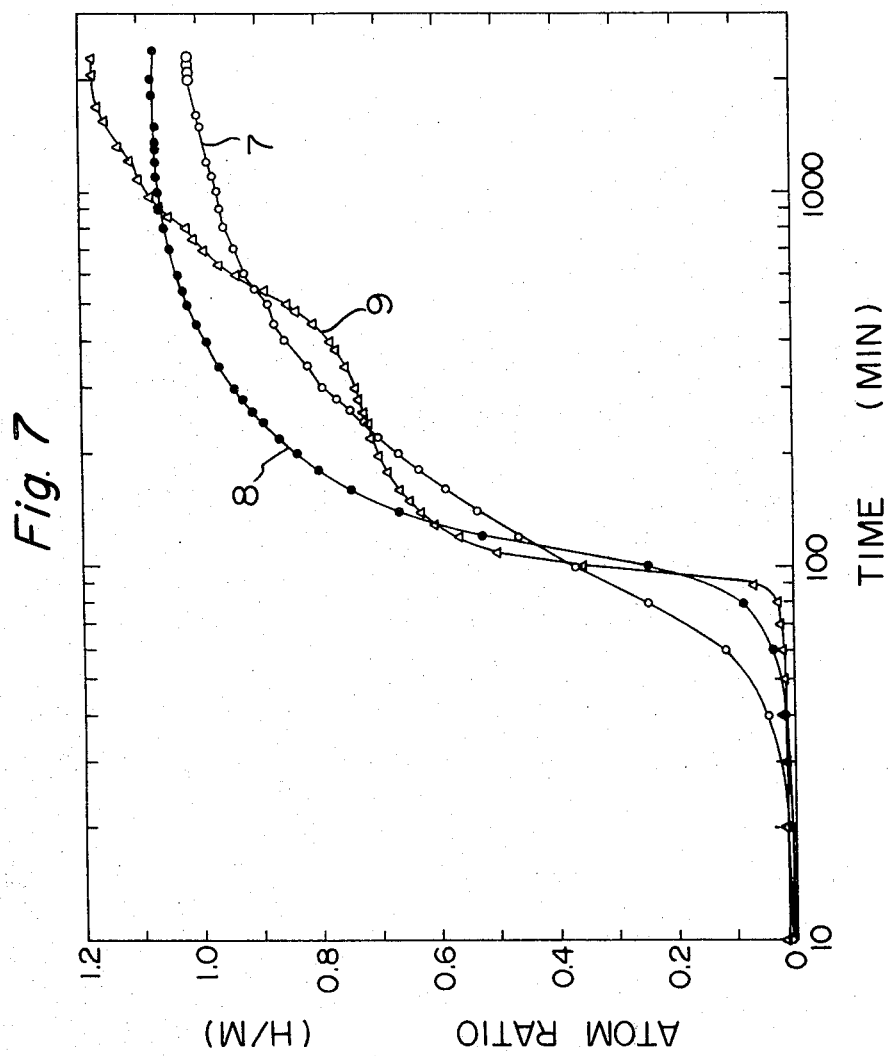

In FIG. 5, the abscissa represents the atom ratio (H/M), and the ordinate, the dissociation pressure of hydrogen (atm.). In FIG. 5, curves a, b and c show the results obtained at 20°, 40° and 60° C., respectively.

It is seen from the results obtained that a hydride having the same atom ratio releases hydrogen at higher pressures when it was placed at higher temperatures.

EXAMPLE 4

In the same way as in Example 1, powders (smaller than 100 mesh) of alloys having the compositions shown in Table 1 were produced.

TABLE 1

| Sample No. | $Fe_xNb_yTi_z$ | | | Numbers of curves in FIGS. 6 to 9 |
|---|---|---|---|---|
| | x | y | z | |
| 1 | 0.4975 | 0.005 | 0.4975 | 4 |
| 2 | 0.442 | 0.006 | 0.552 | 5 |
| 3 | 0.476 | 0.048 | 0.476 | 6 |
| 4 | 0.488 | 0.049 | 0.463 | 7 |
| 5 | 0.465 | 0.070 | 0.465 | 8 |
| 6 | 0.410 | 0.077 | 0.513 | 9 |
| 7 | 0.432 | 0.027 | 0.541 | 10 |

The hydrogen absorbing rates of these samples were measured in the same way as in Example 1, (1) except that the temperature was changed to 25° C.

Figure 8:
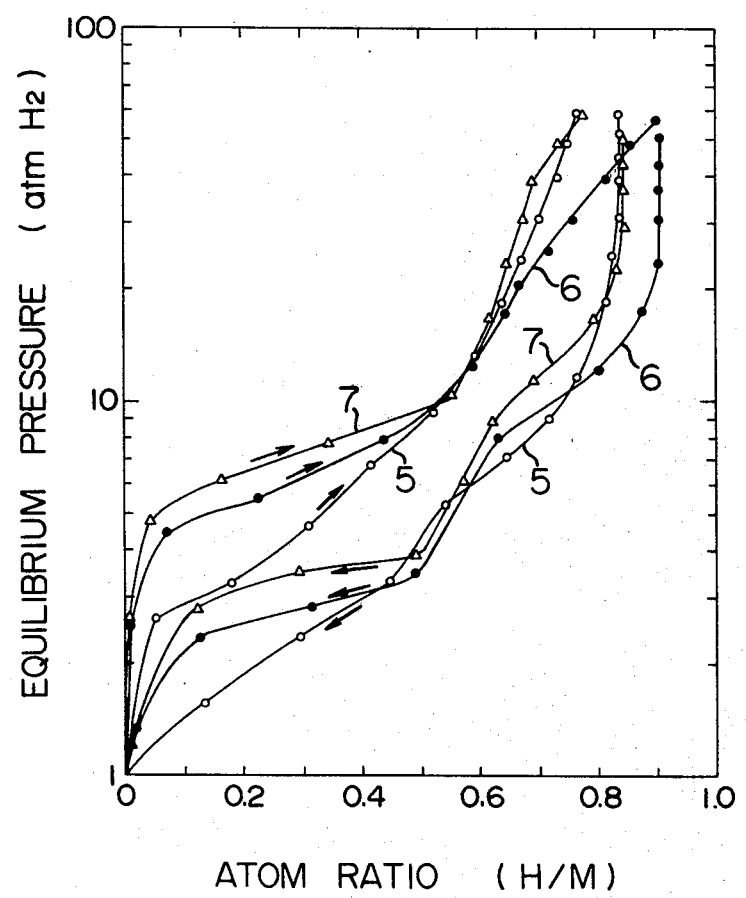
FIGS. 8 and 9 are graphs showing the hydrogen absorbing equilibrium pressures and hydrogen dissociation equilibrium pressures of the hydrides of six different alloys from Example 4.
Figure 9:
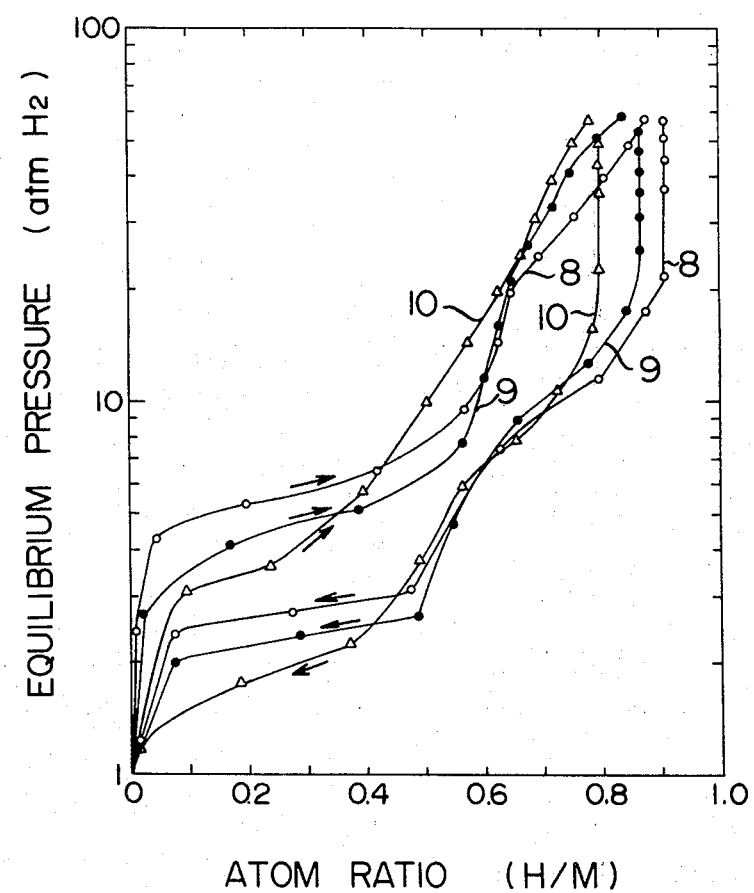

FIGS. 8 and 9 show the results obtained by activating the alloys (sample Nos. 1 to 7) in the same way as in Example 1, and then measuring their hydrogen absorbing equilibrium pressures and the hydrogen dissociation equilibrium pressures of the hydrides of these alloys. In FIGS. 8 and 9, the abscissa represents the atom ratio (H/M), and the ordinate, the equilibrium pressure (atm.). In these figures, the upwardly directed arrows show curves at the time of absorption, and the downwardly directed arrows, curves at the time of dissociation.

What we claim is:

1. An iron-titanium-niobium alloy of the following formula

wherein $x+y+z=1$, $0.50 \geqq x \geqq 0.40$, and $0.10 \geqq y \geqq 0.005$.

2. An iron-titanium-niobium alloy according to claim 1 having the following formula $Fe_{x_1}Nb_{y_1}Ti_{z_1}$ wherein $x_1+y_1+z_1=1$, $0.50 \geqq x_1 \geqq 0.41$, $0.08 \geqq y_1 \geqq 0.005$, and $0.56 \geqq z_1 \geqq 0.44$.

3. A hydrogen storage medium comprising a fine powder of an iron-titanium-niobium alloy of the following formula

wherein $x+y+z=1$, $0.50 \geqq x \geqq 0.40$, and $0.10 \geqq y \geqq 0.005$.

4. A hydride of an iron-titanium-niobium alloy having the formula following

wherein $x+y+z=1$, $0.50 \geqq x \geqq 0.40$, and $0.10 \geqq y \geqq 0.005$.

5. A process for producing a hydride of an iron-titanium-niobium alloy, which comprises contacting with high-pressure hydrogen gas a fine powder of an iron-titanium-niobium alloy having the following formula

wherein $x+y+z=1$, $0.50 \geqq x \geqq 0.40$, and $0.10 \geqq y \geqq 0.005$.

6. The process of claim 5 wherein said contacting is effected at room temperature.

* * * * *